United States Patent [19]
Sienknecht

[11] 4,295,279
[45] Oct. 20, 1981

[54] HAND TOOL LEVELING APPARATUS

[76] Inventor: Walter F. Sienknecht, 3839 Temple City Blvd., Rosemead, Calif. 91770

[21] Appl. No.: 128,723

[22] Filed: Mar. 10, 1980

[51] Int. Cl.³ .............................................. G01C 9/28
[52] U.S. Cl. ....................................... 33/334; 33/373; 33/381; 33/390
[58] Field of Search ................. 33/334, 380, 373, 379, 33/372, 390, 381

[56] References Cited
U.S. PATENT DOCUMENTS

| D. 220,124 | 3/1971 | Powell | 33/373 |
|---|---|---|---|
| 1,234,594 | 7/1917 | Wilner | 33/334 |
| 2,406,211 | 8/1946 | Flint | 33/380 |
| 4,154,001 | 5/1979 | Serafin | 33/373 |

Primary Examiner—William D. Martin, Jr.
Attorney, Agent, or Firm—Christie, Parker & Hale

[57] ABSTRACT

Leveling apparatus for a hand tool such as an electric drill or reciprocating saw is comprised of both a cylindrical bubble level and circular bubble level. The cylindrical bubble level has a longitudinal axis parallel to the working axis of the tool, and thus is utilized for leveling the tool in a horizontal plane. The circular bubble level has an axis passing perpendicularly through its center which is parallel to the working axis of the tool. The circular bubble is utilized for vertically aligning the tool normal to a horizontal datum plane. The bubble of the cylindrical bubble level is viewable from a multiplicity of perspectives. The apparatus may be selectively attached to the drill of different positions on the tool to further improve visibility of the bubble levels. Alternatively, the apparatus is integrated into the housing of the drill.

9 Claims, 8 Drawing Figures

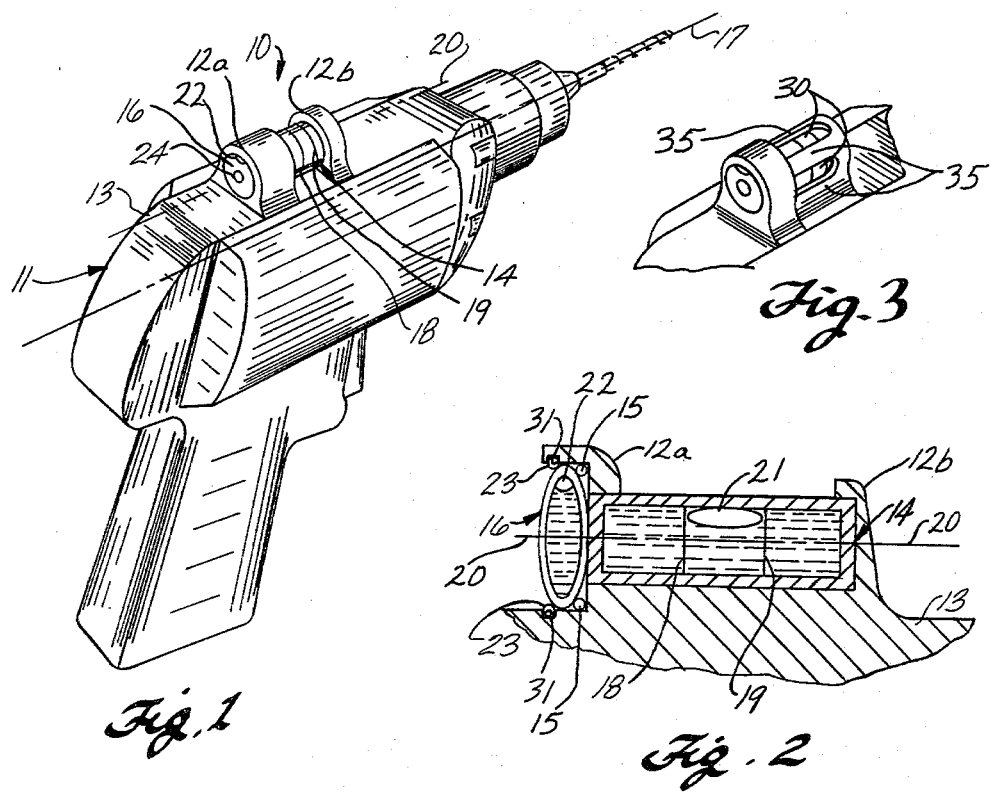

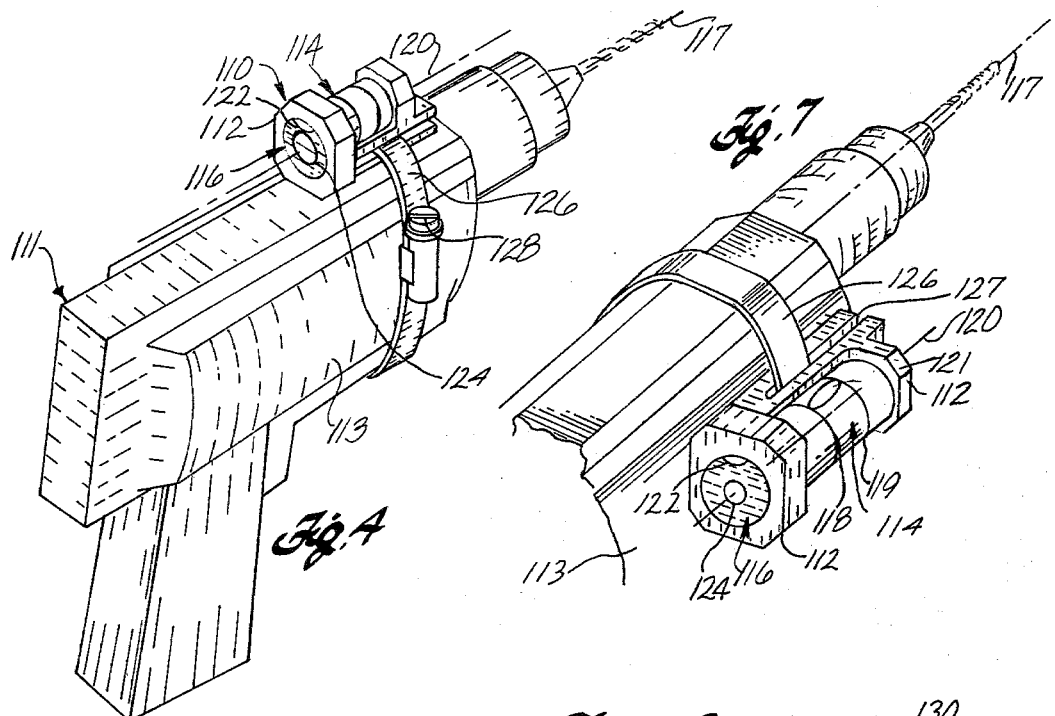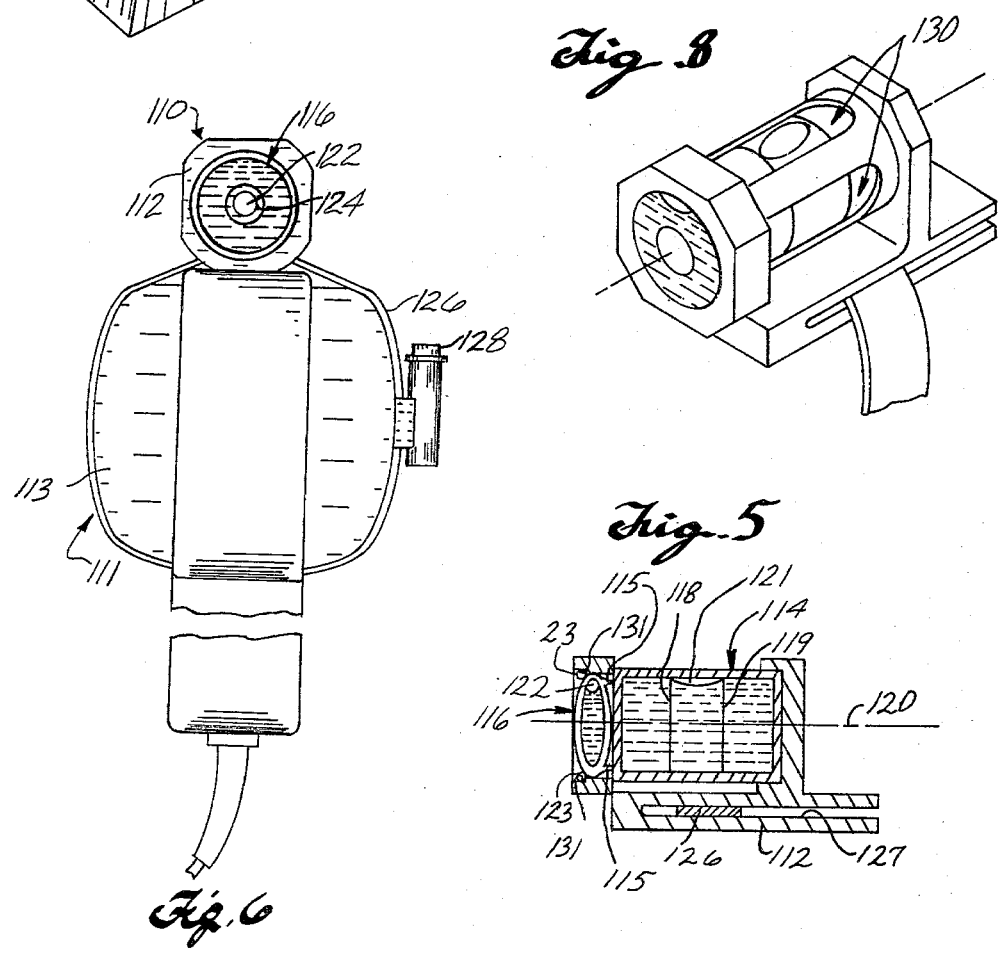

HAND TOOL LEVELING APPARATUS

BACKGROUND OF THE INVENTION

This invention relates to apparatus for leveling the working axis of various hand tools specifically electric drills and reciprocating saws. The working axis of a tool, as hereinafter used, refers to the central longitudinal axis of the cutting, boring or drilling element of the tool which is ordinarily disposed normal to a workpiece. For example, the working axis of an electric drill is coincident with the central longitudinal axis of the drill bit.

One type of leveling device in common use utilizes either a circular or cylindrical bubble level. The level is attached to the tool such that alignment of the working axis of the tool may be selectively maintained in either vertical or horizontal datum planes by aligning a bubble within the level in accordance with the design of the level. Prior art provides a single cylindrical bubble level which may be rotatable, for example, U.S. Pat. No. 1,333,559 to Moulton; or, alternatively a pair of circular bubble levels which may be oriented at a 90° angle, for example U.S. Pat. No. 4,141,151 to Jansky. In each case the design is an attempt to permit the working axis of a drill to be selectively aligned either horizontally or vertically. A principle application of the leveling device described herein is the drilling or boring of horizontal or vertical holes or the maintenance of the blade of a reciprocating saw in a vertical or horizontal position. The present invention provides accurate and reliable means for leveling a tool without the use of rotatable bubble levels and incorporating both cylindrical and circular bubble levels and thus obtaining the advantages of each.

Where a single cylindrical bubble level is utilized for leveling the working axis of the drill in a horizontal plane, the same cannot be used for vertically aligning the tool normal to a horizontal datum plane, even if the level were rotatable, because aligning of the tool requires simultaneous two dimensional alignment in intersecting planes which is not possible with a single cylindrical level. Thus, a circular bubble is often used to vertically align the working axis normal to a horizontal datum plane because simultaneous two dimensional alignment is possible. However, where a circular bubble is also utilized for leveling the working axis in a horizontal plane, difficulty is encountered in leveling the tool.

In order to horizontally align the tool, its working axis must be parallel to a reference axis which intersects the cross hairs or bull's eye of the circular bubble level and lies in the plane of the level. Horizontal leveling is accomplished by displacing the working axis within a selected vertical datum plane while centering the bubble with respect to the cross hairs or bull's eye. However, if the circular level is rotated about its reference axis by rotation of the tool about its working axis, the bubble cannot be centered with respect to the bull's eye or cross hairs and thus, the tool cannot be horizontally leveled. For instance, it is common practice to rotate an electric drill about its working axis to facilitate drilling in corners etc. This type of rotational displacement would preclude the horizontal leveling of the working axis where a circular bubble level is utilized as shown in the Jansky reference.

This problem is not encountered where a cylindrical bubble is used for horizontal leveling because only displacement in the vertical datum plane is registered by the cylindrical bubble level despite rotating of the tool. The present invention incorporates a circular bubble level for vertically aligning and a cylindrical bubble level for horizontal leveling thus alleviating the limitations of the prior art.

An additional problem with prior art leveling devices is that they are attached to the tool in such a manner that they are not visible to the operator in all orientations of the tool. For instance the tool may be utilized in a corner such that view of the bubble level is prevented by one or more surfaces adjacent to the working surface. The present invention provides for viewing of the bubble levels from a multiplicity of perspectives. Furthermore, in a preferred embodiment the entire leveling device may be selectively attached to the tool to facilitate viewing of the levels from a multiplicity of perspectives.

SUMMARY OF THE INVENTION

Accordingly, the present invention provides an apparatus for leveling a tool having a working axis which comprises an elongated cylindrical bubble level attached to the tool with its longitudinal axis parallel to the working axis for leveling the tool in a horizontal plane; and a circular bubble level attached to the tool with an axis passing perpendicularly through the center of the circular level which is disposed parallel to the working axis of the tool for aligning the tool normal to a horizontal datum plane.

In a preferred embodiment a portion of the tool housing forms a receptacle for mounting the cylindrical bubble level and the circular bubble level, such that the circular level retains the cylindrical level within the receptacle. The retaining means may include circular wire clips or rubber grommets.

In an alternative preferred embodiment the cylindrical and circular bubble levels are disposed within an elongated mounting which is removably securable to the tool. Thus, the apparatus may be selectively positioned about the tool such that the longitudinal axis of the cylindrical bubble is disposed parallel to the working axis of the tool.

This apparatus for leveling a hand tool provides a means for accurately leveling the tool's working axis in a horizontal plane using a cylindrical bubble level thus precluding the attendant problems with horizontal leveling utilizing a circular level. Furthermore, the advantages of a circular level are employed for aligning the tool vertically or normal to a horizontal datum plane. Additionally, the apparatus permits the user to view the bubble levels from a multiplicity of perspectives thus greatly extending the utility of this apparatus. An additional feature of this invention permits the apparatus to be incorporated into the housing of the tool itself while still permitting the bubble levels to be viewed from a multiplicity of perspectives.

BRIEF DESCRIPTION OF THE DRAWINGS

The features of specific embodiments of the invention are illustrated in the drawings in which:

FIG. 1 is a perspective view of an electric drill having leveling apparatus incorporating the principles of the invention;

FIG. 2 is a side sectional view of the leveling apparatus of FIG. 1;

FIG. 3 is a perspective view of an alternative embodiment of the leveling apparatus;

FIG. 4 is a perspective view of an electric drill having an alternative embodiment of the leveling apparatus incorporating the principles of the invention;

FIG. 5 is a side sectional view of the alternative embodiment of the leveling apparatus of FIG. 4;

FIG. 6 is an end view of a vertically aligned electric tool showing the alternative embodiment of the leveling apparatus of FIG. 4 incorporating the principles of the invention;

FIG. 7 is a perspective view showing the alternative embodiment of the invention of FIG. 4 being mounted on one side of an electric drill; and FIG. 8 is a perspective view of an alternative embodiment of the apparatus of FIG. 4.

DETAILED DESCRIPTION

In FIGS. 1 and 2 a leveling apparatus 10, incorporating the principles of a preferred embodiment of the invention is shown integrated into a tool's housing, here exemplifed by an electric drill 11. Mountings 12a and 12b are formed by the housing 13 of the tool. A cylindrical bubble level 14 is mounted within the mountings 12a and 12b with its longitudinal axis 20 approximately parallel to the working axis 17 of the tool 11 for leveling the tool in a horizontal plane. A circular bubble level 16 is mounted in mounting 12a with an axis passing perpendicularly through the level at the center line, the axis being disposed parallel to the working axis 17 of the tool for aligning the tool normal to a horizontal datum plane.

In the preferred embodiment, the axis passing perpendicularly through the center of the circular level is coaxial with the longitudinal axis 20 of the cylindrical level. Alternative embodiments include those where these axes are non-coaxial but parallel.

The circular level is seated against a removable ring 15 constructed from plastic, metal or the like. Alternatively, the ring 15 may be incorporated into the circular bubble level itself.

The cylindrical bubble level 14 comprises a sealed cylindrical tube made from glass, plastic or other transparent material containing a transparent liquid which forms a bubble 21. When the longitudinal axis 20 of the cylindrical bubble level 14 lies in a horizontal plane, the bubble 21 will be centered between index lines 18 and 19 scribed on the surface of the level. Because the cylindrical bubble level 14 is mounted within mountings 12a and 12b with its longitudinal axis 20 parallel to the working axis 17 of the tool, the user may align the working axis in a horizontal plane by simply positioning the tool so that the bubble 21 is positioned between the index lines.

In several preferred embodiments the circular bubble level 16 is elliptical, oval or biconvex in cross section. It is constructed of glass, plastic or transparent material and contains a transparent liquid forming a bubble 22. A circular bull's eye 24 or alternatively cross hairs are scribed on at least one surface of the circular bubble. When the axis passing through the center of the circular bubble 16 is vertically oriented such that it is normal to a horizontal datum plane, the bubble 22 is centered with respect to the bull's eye 24 or with respect to the cross hairs and the tool is correctly aligned in the vertical direction.

Because of the elliptical, biconvex or oval cross-sectional design of the circular level 16 the tool may be leveled in a vertical plane either above the observer or below due to the fact that the bubble 22 may be centered on either the inwardly facing inner surface or outwardly facing inner surface of the circular level.

In the preferred embodiment the mountings 12a and 12b provide support and alignment for both the circular 16 and cylindrical 14 bubble levels. The receptacles are integral with the housing 13 of the tool and are consequently constructed of the same material such as high impact transparent or opaque plastic or cast metal. Mounting 12a has cylindrically shaped interior and slidably receives one end of the cylindrical bubble level 14 without obstructing the view of the index lines 18 and 19. Mounting 12b has a cylindrical interior and similarly receives the opposite end of the cylindrical bubble level such that the cylindrical bubble level is securely attached to the tool. Aft of the cylindrical bubble level 14 mounting 12a defines a circularly shaped recess. This recess is provided for receiving the circular bubble level 16 to permit the level to be disposed with the axis passing perpendicularly through the level at the center line, the axis parallel to the longitudinal axis 20 of the cylindrical bubble.

The circular bubble level 16 is retained in the housing by means of a spring wire clip 23, rubber grommet or other fastening device which resides in a groove 31 disposed in the inside circumference of the recess provided for the circular bubble level. This clip 23 firmly secures the circular bubble level 16 which in turn prevents motion of the cylindrical bubble level along its longitudinal axis 20. This arrangement allows simplified replacement of either bubble level by removing the clip 23 where, for example, either level gets broken. Alternatively, the mountings or receptacles for the levels could be separate and independent structures provided the positioning of each relative to the working axis of the tool and to each other is maintained in accordance with the teachings of this invention.

The mountings are constructed such that the user may view the cylindrical bubble level 16 from a multiplicity of perspectives. This is achieved by minimizing the amount of tool housing material in the area of the index lines of the cylindrical level as shown in FIG. 1, for example. This may be accomplished alternatively by providing a multiplicity of apertures 30 (FIG. 3) disposed along the longitudinal axis of the cylindrical level and defined by bars 35 interconnecting the mountings.

Referring to FIGS. 4, 5, 6 and 7 an alternative embodiment of a device 110 having an elongated mounting 112, which is selectively attachable to the tool 111 which, by way of example, is an electric drill. The mounting is constructed of a rigid material such as cast metal or transparent or opaque plastic and provides for attachment of both a cylindrical bubble level 114 and a circular bubble level 116. The cylindrical bubble level 114 is attached to the mounting 112 with its longitudinal axis 120 approximately parallel to the working axis 117 of the tool 111 for leveling the tool in a horizontal plane. The circular bubble level 116 is attached to the mounting 112 with an axis passing perpendicularly through the level at the center line, the axis being disposed approximately parallel to the working axis 117 of the tool for aligning the tool normal to a horizontal datum plane. The circular level is seated against a ring 115 incorporated into the bubble. Alternatively the ring may be removable.

The cylindrical bubble level 114 comprises a sealed cylindrical tube made from glass, plastic or other transparent material containing transparent liquid which forms a bubble 121. When the longitudinal axis 120 of the cylindrical bubble 114 lies in a horizontal plane, the bubble 121 will be centered between index lines 118 and 119 scribed on the surface of the level. Because the cylindrical bubble level 114 is attached to the mounting 112 with its longitudinal axis 120 parallel to the working axis 117 of the tool, the user may align the working axis in a horizontal plane by simply positioning the tool so that the bubble 121 is positioned between the index lines.

In several preferred embodiments the circular bubble level 116 is elliptical, oval or biconvex in cross section. It is constructed of glass, plastic or transparent material and contains a transparent liquid forming a bubble 122. A circular bull's eye 124 or alternatively cross hairs are scribed on at least one surface of the circular bubble level. When the axis passing perpendicularly through the center of the circular bubble 116 is vertically aligned so that it is normal to a horizontal datum plane the bubble 122 is centered with respect to the bull's eye 124 as shown in FIG. 6.

Because of the elliptical, biconvex or oval cross-sectional design of the circular level 116 the tool may be aligned in a vertical plane either above the observer or below due to the fact that the bubble 122 may be centered on either the inner inwardly facing surface or inner outwardly facing surface of the circular level.

In order to permit viewing of the bubble from a maximal number of perspectives, the mounting 112 can be selectively attached to the tool in a plurality of positions while maintaining the longitudinal axis 120 of the cylindrical bubble 114 and the axis passing perpendicularly through the center of the circular bubble 116 in an alignment parallel to the working axis 117 of the tool.

The mounting 112 defines a slot 127 through which a band or mounting strap 126 passes. The band is then positioned around the housing 113 of the tool 111 and has its end securely attached by means of a worm gear clamp 128. Consequently, the user may selectively attach the leveling device to the tool by merely loosening the clamp 128 thus allowing the mounting strap 126 and elongated mounting 112 to be selectively rotated about the tool 111. For example, FIG. 4 shows the leveling device being mounted on the top surface of an electric drill while FIG. 7 shows the same apparatus mounted on the side of the drill. Because the leveling apparatus can be selectively attached to the drill, almost universal viewing of the cylindrical bubble level for aligning the tool in a horizontal plane is achieved.

FIG. 8 depicts an alternative embodiment wherein the mounting defines a multiplicity of apertures 130 disposed along the longitudinal axis of the cylindrical level. This design also permits viewing of the cylindrical bubble level from a multiplicity of perspectives in order to align the tool in a horizontal plane.

The described embodiments of the invention are only to be considered preferred and illustrative of the inventive concepts; the scope of the invention is not to be restricted to such embodiments. Various and numerous other arrangements may be devised by one skilled in the art without departing from the spirit and scope of this invention. For example, rather than utilizing a worm gear clamp for selectively attaching the leveling device to a tool, a series of mounting pads and threaded apertures could be incorporated into the housing of the tool which would allow the user to selectively attach the device by means of screws and the like to said pads. These pads would be designed to insure maintenance of the proper alignment of the bubble levels with respect to the working axis of the tool.

What is claimed is:

1. Apparatus for leveling a tool having a working axis comprising:

a receptacle of a predetermined configuration attached to the tool;

an elongated, sealed, transparent cylindrical tube containing a liquid and a bubble formed by the liquid, said tube being mounted in the receptacle with its horizontal axis parallel to the working axis of the tool to level the tool in a horizontal plane, the receptacle being configured so as to enable viewing the bubble in the cylindrical level from at least the top and both sides thereof.

a circular bubble level mounted in the receptacle having an axis passing perpendicular through the center of the circular level, said axis being disposed parallel to the working axis of the tool for leveling the tool in a vertical plane, said circular level containing a transparent liquid and a bubble formed by the liquid, said circular level being biconvex in cross-section and positioned in the receptacle whereby the bubble can be properly positioned in the level to level the tool in either the vertical upward or vertical downward positions and the circular level retains the cylindrical level in the receptacle; and resilient means for removably locking the circular bubble level within the receptacle.

2. The apparatus of claim 1 wherein the resilient means is a circular wire clip.

3. The apparatus of claim 1 wherein the locking means is a rubber grommet.

4. The apparatus of claim 1 wherein the receptacle is provided with a groove adjacent the position of the circular level for receiving the resilient means.

5. The apparatus of claim 1 wherein the receptacle is incorporated into a housing for the tool.

6. The apparatus according to claim 5 wherein the material from which the housing for the tool is fabricated is transparent.

7. Apparatus according to claim 1 wherein the receptacle means is removably securable to the tool.

8. Apparatus according to claim 1 wherein the receptacle means defines a plurality of elongated apertures corresponding to the top and both sides thereof.

9. Apparatus according to claim 1 wherein the receptacle means includes retaining means located at each end of the cylindrical level to allow the cylindrical level to be viewed from an angular position encompassing the level which subtends an angle of approximately 270°.

* * * * *